United States Patent [19]

Yan

[11] 4,139,397

[45] Feb. 13, 1979

[54] PAVING GRADE ASPHALT COMPOSITIONS

[75] Inventor: Tsoung-Yuan Yan, Philadelphia, Pa.

[73] Assignee: Mobil Oil Corporation, New York, N.Y.

[21] Appl. No.: 801,335

[22] Filed: May 27, 1977

Related U.S. Application Data

[63] Continuation of Ser. No. 658,958, Feb. 18, 1976, abandoned.

[51] Int. Cl.² ............................................. C08L 95/00
[52] U.S. Cl. .................................. 106/278; 106/279; 106/284; 208/22; 208/44; 260/28.5 AS
[58] Field of Search ....................... 106/278, 279, 284; 260/28.5 AS; 208/22, 44

[56] References Cited

U.S. PATENT DOCUMENTS

| | | | |
|---|---|---|---|
| 2,888,357 | 5/1959 | Pittman et al. | 106/284 |
| 3,607,718 | 9/1971 | Leaders et al. | 208/10 |
| 3,642,608 | 2/1972 | Roach et al. | 208/8 |
| 3,919,148 | 11/1975 | Winters et al. | 260/28.5 AS |

*Primary Examiner*—Lorenzo B. Hayes
*Attorney, Agent, or Firm*—Charles A. Huggett; Carl D. Farnsworth

[57] ABSTRACT

This invention provides a process for producing road paving asphalt compositions which involves heating an admixture of coal tar and fluidized catalytic cracking syntower bottoms until a homogeneous solubilized product with asphaltic properties is formed. The preferred asphalt compositions have a quantity of scrap rubber incorporated and dissolved therein.

9 Claims, No Drawings

PAVING GRADE ASPHALT COMPOSITIONS

This is a continuation of application Ser. No. 658,958 filed Feb. 18, 1976 now abandoned.

BACKGROUND OF THE INVENTION

Within the last one hundred years, petroleum has become the overwhelming primary commodity as an organic raw material. Petroleum has had the advantages of low cost and ease of transportation and storage because of its liquid consistency. Further, petroleum is readily amenable to fractionation and conversion into a variety of valuable industrial products such as fuels, building products, chemical intermediates, and the like.

Recent international economic developments have signaled the inevitable decline of petroleum as the world's supreme industrial commodity. The price of raw petroleum has increased several fold. Also, the consumption of petroleum has been increasing exponentially and concomitantly the world petroleum supply has diminished to less than several decades of proven reserves.

Governments and industries on a priority basis are dedicating increased attention to alternatives to petroleum as sources for fuels and chemical intermediates, e.g., substantial reserves of coal exist in highly industrialized countries.

It was recognized by early workers that coal can be liquified by controlled heating in the substantial absence of oxygen. The conversion products are a liquid and a char. Because of the new compelling economic factors, the technology of coal liquefaction and gasification has been expanding at an accelerated pace. Pioneer developments in the field are represented by Lurgi and Fischer-Tropsch technology. More recent advances in coal liquefaction are described in U.S. Pat. Nos. 1,904,586; 1,955,041; 1,996,009; 2,091,354; 2,174,184; 2,714,086; 3,375,188; 3,379,638; 3,607,718; 3,640,816; 3,642,608; 3,705,092; 3,849,287 3,870,621; inter alia.

One of the new developments in Fischer-Tropsch technology, i.e, the Sasol process, has been expanded into a commercial venture for converting low grade coal into synthesis gas, and a broad spectrum of organic derivatives such as fuel gas, light olefins, LPG, gasoline, light and heavy fuel oils, waxy oils, and oxygenated chemicals such as alcohols, ketones and acids. A byproduct of the Sasol commercial operation is coal tar. The formation of coal tar byproduct affects the economics of the Sasol operation, and the increasing accumulation of this byproduct stream has environmental implications.

There remains a pressing need for new technology for the conversion of coal into carbonaceous products which complement and enhance conventional petroleum derived industrial applications. Innovative processes are required for upgrading poor quality coal and coal byproducts into commodity materials.

Further, the phenomenon of world population growth and the competition for limited natural resources have compelled governmental agencies and the academic and business communities to initiate and promulgate programs for the conservation of natural resources and the stabilization of ecological factors. Reclaiming and recycling of expended commodities has become an overriding consideration in progressive legislation for environmental protection and control of natural resource exploitation.

Accordingly, it is an object of the present invention to provide novel manufactured petroleum products which contain substantial quantities of organic components which are not petroleum-derived raw materials.

It is another object of the present invention to upgrade low value petroleum byproduct streams from refinery operations into valuable commercial products.

It is another object of the present invention to provide a process for producing asphaltic products which contain a substantial quantity of recycled waste materials.

It is a further object of the present invention to provide an economically attractive process for converting coal tar into paving grade ashalt.

Other objects and advantages of the present invention shall become apparent from the accompanying description and examples.

DESCRIPTION OF THE INVENTION

The present invention is concerned with producing asphalt compositions by forming a slurry of coal tar and a petroleum solvent selected from thermally stable highly refractory products of catalytic cracking boiling above about 650° F., and heating the formed slurry at a temperature in the range between about 350° F. and 850° F. for a period of time sufficient to convert the slurry into a homogeneous composition having asphaltic properties at ambient temperature.

By the term "thermally stable" refinery petroleum fractions is meant a high boiling petroleum residuum such as a TCC or FCC catalytic cracker "syntower" or main column bottoms which contains a substantial proportion of polycyclic aromatic hydrocarbon constituents such as naphthalene, dimethylnaphthalene, anthracene, phenanthrene, fluorene, chrysene, pyrene, perylene, diphenyl, benzothiophene, and the like. Such refractory petroleum media are very resistant to conversion to lower molecular products by conventional non-hydrogenative procedures. Typically, these petroleum refinery media containing residua and recycle fractions are hydrocarbonaceous mixtures having an average carbon to hydrogen ratio above about 1:1, and a 5% (percent) boiling point above about 650° F.

Syntower bottoms as used herein is intended to identify the bottom product obtained from the product fractionator of a TCC operation. Main column bottoms as used herein is intended to refer to the bottom product obtained from the product fractionator of a FCC operation. Catalyst fines may be separated from the bottoms before use.

The petroleum solvents suitable for the practice of the present invention process are thermally stable, highly polycyclic aromatic mixtures which result from one or more petroleum refining operations. Representative heavy petroleum solvents include syntower bottoms; main column bottoms; asphalt; alkanedeasphalted tar; coker gas oil; heavy cycle oil; clarified slurry oil; mixtures thereof, and the like.

The nominal properties of suitable petroleum solvents are as follows:

| Syntower Bottom | |
|---|---|
| Sulfur | 1.13% |
| Nitrogen | 450 ppm |
| Pour Point | 50° F. |
| 5% Boiling Point | 640° F. |
| 95% Point | 905° F. |
| Conradson Carbon | 9.96 |
| Clarified Slurry Oil | |

| -continued | |
|---|---|
| Sulfur | 1.04% |
| Nitrogen | 4400 ppm |
| Pour Point | 50° F. |
| 5% Boiling Point | 630° F. |
| 95% Point | 924° F. |
| Conradson Carbon | 10.15 |
| Heavy Cycle Oil | |
| Sulfur | 1.12% |
| Nitrogen | 420 ppm |
| 5% Boiling Point | 450° F. |
| 95% Point | 752° F. |
| Conradson Carbon | 10.15 |

A TCC "syntower" bottoms of an FCC main column bottoms refinery fraction is a highly preferred solvent composition suitable for the practice of the present invention. A typical FCC "main column" bottoms contains a mixture of chemcial constituents as represented in the following mass spectrometric analysis:

| Compounds | Aromatics | Naphthenic/ Aromatics | Labile Hydrogen |
|---|---|---|---|
| Alkyl Benzene | 0.4 | | 0 |
| Naphthene Benzenes | | 1.0 | 0.03 |
| Dinaphthene Benzenes | | 3.7 | 0.16 |
| Naphthalenes | 0.1 | | 0 |
| Acenaphthenes, (biphenyls) | | 7.4 | 0.08 |
| Fluorenes | | 10.1 | 0.11 |
| Phenanthrenes | 13.1 | | |
| Naphthene phenanthrenes | | 11.0 | 0.18 |
| Pyrenes, fluoranthenes | 20.5 | | 0 |
| Chrysenes | 10.4 | | 0 |
| Benzofluoranthenes | 6.9 | | 0 |
| Perylenes | 5.2 | | 0 |
| Benzothiophenes | 2.4 | | |
| Dibenzothiophenes | 5.4 | | |
| Naphthobenzothiophenes | | 2.4 | 0.04 |
| Total | 64.4 | 35.6 | 0.60 |

A typical FCC "main columns" bottoms has the following nominal analysis and properties:

| Elemental Analysis, Wt.%: | | |
|---|---|---|
| C | | 89.93 |
| H | | 7.35 |
| O | | 0.99 |
| N | | 0.44 |
| S | | 1.09 |
| Total | | 99.80 |
| Pour Point, ° F.: | | 50 |
| CCR,%: | | 9.96 |
| Distillation: | | |
| IBP, | ° F.: | 490 |
| 5%, | ° F.: | 640° F. |
| 95%, | ° F.: | 905 |

An FCC main tower bottoms product is obtained by the fluidized catalytic cracking of gas oil in the presence of a solid porous catalyst and separation of the products of cracking in a product fractionator. A more complete description of the production of this petroleum by-product stream is disclosed in U.S. Pat. No. 3,725,240.

It has been found that a highly refractory bottoms product fraction of fluid catalytic cracking FCC is an excellent solvent for coal tar because it has an average labile hydrogen content of about 0.3 percent or more, a benzylic hydrogen (α) content of about 1.5 percent or more, an aromatic hydrogen content of about 2 percent or more and a content of β γ and other hydrogen of about 4 percent or less.

The coal tar component employed in this process of this invention preferably has a softening point in the range between about 100° F and about 350° F, and a boiling point in the range between about 500° F and about 1100° F. The highly preferred coal tars are those having a boiling point in the range between about 700° F. and about 1000° F. Suitable coal tars are those obtained from the pyrogenous treatment of bituminous material (e.g. coke oven coal tar or pitch), and from high temperature coal conversion processes such as the Lurgi gasification process.

In accordance with this invention, a thermally stable FCC main column bottoms component or fraction is employed as a solvent medium for the solubilization of a coal tar component comprising particularly asphaltens. The petroleum solvent comprising a highly refractory polycyclic aromatic fraction and the coal tar are admixed to form a slurry. The slurry thus formed is heated to a temperature in the range between about 250° F. and 850° F., and preferably to a temperature between about 350° F. and 650° F. The invention process can be conducted in an open system, or in a closed system under moderate or high pressures.

The slurry formed as above provided is heated for a reaction time sufficient to yield a solubilized composition which upon cooling to ambient temperatures remains homogeneous and has an asphaltic consistency. The heating step above identified is conducted for a period of time between 0.1 and 3 hours, and preferably for a period of time between about 0.3 and 1.5 hours.

The amount of petroleum solvent component used to form the solubilized mixture if provided in a quantity between about 0.2 and 20 parts by weight per part by weight of the coal tar component depending on the penetration level of the asphalt product desired. Normally, the preferred ratio will be in the range between about 0.5 and 5.0 parts by weight of petroleum solvent per part by weight of coal tar. Typical asphalt compositions will contain between about 20 and 60 weight percent coal tar.

In another important embodiment of the present invention, a synthetic asphalt composition is formed by the process combination which comprises forming a slurry by admixing a coal tar and comminuted scrap rubber with a thermally stable highly refractory bottoms product of catalytic cracking as the petroleum solvent, and heating said slurry at a temperature in the range between about 350° F. and 850° F. for a period of time up to about 3 hours, but sufficient to convert the slurry into a homogenous asphaltic composition having excellent ductility and durability characteristics. A heating time as low as 0.2 of an hour may also be employed.

In this process embodiment the ratio of scrap rubber to coal tar in the slurry admixture is selected to be within the range of about .01 and 5 parts by weight of scrap rubber per part by weight of coal tar, and preferably in the range between about 0.05 and 1 part by weight of scrap rubber per part by weight of coal tar. The petroleum solvent component of the slurry is in a quantity between about 0.2 and 20 parts by weight of petroleum solvent per part of the combined weight of scrap rubber and coal tar components in the slurry. On the average, the preferred ratio will be in the range between about 0.5 and 5 parts by weight of petroleum solvent per part by weight of the scrap rubber and coal tar.

The comminuted scrap rubber which is admixed with the coal tar and petroleum solvent is selected from natural and synthetic hydrocarbon rubbers. These rubbers are generally non-oil resistant and asphalt soluble, and can be either vulcanized or unvulcanized. While it is possible to employ new and unused elastomeric materials as the rubber component in the present invention compositions, it is particularly advantageous to employ "scrap" or "reclaimed" rubber for economic reasons and for purposes of environmental protection. As employed herein, the term "scrap" rubber is meant to include "reclaimed" rubber.

Suitable rubber compositions include natural rubber, isoprene rubber, butadiene rubber, butadiene-styrene rubber, butyl rubber, ethylene-propylene rubber, and the like.

The comminuted scrap rubber can be in the form of (1) ground tire rubber (with or without carcass fibers); (2) unprocessed rubber buffings, i.e., a byproduct of tire retreading; (3) ground inner tubes; (4) reclaimed rubber;(5) partially devulcanized reclaimed rubber; and the like.

The reclaimed rubber can be devulcanized or partially devulcanized and can be prepared by the digester process, Heater or Pan process, Lancaster-Banbury process, and other conventional reclaiming processes as more fully described in U.S. Pat. No. 3,891,585.

Whole tire rubber can be ground, screened, and treated to remove metal, cord and fabric therefrom prior to usage in the invention process. However, it is a preferred mode of the present invention that whole used tire carcasses be comminuted and employed directly without any prior treatment.

The comminuted scrap rubber component can be introduced into the invention process in the form of fine powder having a particle size in the range between about 40 mesh and 200 mesh. A process for the production of finely powdered scrap rubber is disclosed in U.S. Pat. No. 2,853,742. It is also convenient and practical to employ the scrap rubber in the form of shredded or diced material. The particle size of the shaped rubber cubes or pellets can range from about 0.05 inch to about 0.5 inch in dimensions.

The incorporation of scrap rubber into the invention asphalt compositions herein provided enhances many of the desirable properties of the compositions. Adhesiveness and impact resistance are improved. There is an increase in elastic recovery after deformation. The rubberized asphalt compositions maintain homogeneity at 32° F and lower temperatures, as indicated by extremely high ductility in some cases (e.g., 200 centimeters or more at 39.2° F.). Also, a high degree of low temperature ductility is retained after a five hour thin-film oven test.

The asphalt compositions of the present invention provide a penetration value in the range of about 40–300 (ASTM D 5-49) and thus are suitable for use as binders in known or more conventional asphalt road building practice. If required, the hardness of the present invention asphalt composition can be modified by air-blowing, and either with or without the presence of a catalyst such as phosphorus pentoxide or zinc chloride. The preferred invention asphalt compositions have a ring and ball softening point in the range of about 150° F. to 185° F., and a ductility of more than 100 centimeters at 77° F. (ASTM D 113-44).

Road paving asphalts as known in the art are graded accordingly to penetration values at 77° F. as measured by the standard method of test for penetration of bituminous materials (ASTM D 5-52), the penetration values being measured as the tenths of a millimeter that a tapered standard needle (0.14 to 0.16 mm tip diameter) will penetrate the asphalt in five seconds with a 100 gram load. The overall acceptable penetration range for various asphalt binders used is from 40 to 300. The range 40–70 is generally for asphalt used in hot climates, 79–110 generally for temperate climates, and 110-300 generally for cold climates.

Specifications requirements for asphalt binders are set forth in the following Table I.

TABLE I

NOMINAL SPECIFICATIONS FOR ASPHALT CEMENTS

| | VISCOSITY GRADE | | | | | | | | | |
|---|---|---|---|---|---|---|---|---|---|---|
| | AC-2.5 | | AC-5 | | AC-10 | | AC-20 | | AC-40 | |
| TEST | Min. | Max. | Min. | Max. | Min. | Max. | Min. | Max. | Min. | Max. |
| Viscosity, 140° F., poises | 250 ± 50 | | 500 ± 100 | | 1000 ± 200 | | 2000 ± 400 | | 4000 ± 800 | |
| Viscosity, 275° F., Cs | 80 ± — | | 110 | — | — | — | 210 | — | 300 | — |
| Penetration, 77° F., 100g, 5 sec. | 200 | — | 120 | — | 70 | — | 40 | — | 20 | — |
| Flash Point, ° F., | 325 | — | 350 | — | 425 | — | 450 | — | 450 | — |
| Solubility in trichloroethylene, percent | 99.0 | — | 99.0 | — | 99.0 | — | 99.0 | — | 99.0 | — |
| Tests on residue from Thin-Film Oven Test: | | | | | | | | | | |
| Viscosity, 140° F., poises | — | 1250 | — | 2500 | — | 5000 | — | 10,000 | — | 20,000 |
| Ductility, 77° F., 5 cm per minute, cm | 100 | — | 100 | — | 50 | — | 20 | — | 10 | — |

I claim:

1. A process for producing a paving grade asphalt composition which comprises forming a slurry of coal tar having a boiling point in the range between about 700° F. and 1000° F. and a thermally stable, highly refractory petroleum solvent having a boiling point above about 650° F., an average liable hydrogen content of about 0.3 percent or more, a benzylic hydrogen (alpha) content of about 1.5 percent or more, an aromatic hydrogen content of about 2 percent or more and a content of beta, gamma and other hydrogen of about 4 percent or less; and heating the slurry admixture thus formed to a temperature in the range between about 350° F. and 850° F. for a period of time sufficient to convert the slurry admixture into a homogeneous composition exhibiting asphaltic properties at ambient temperatures and having an ASTM penetration value of 40–300 at 77° F.

2. A process in accordance with claim 1 wherein the slurry admixture is heated for a period of time up to about 3 hours.

3. A process in accordance with claim 1 wherein the petroleum solvent component in the slurry admixture is present in a quantity between about 0.2 and 20 parts by weight per part by weight of the coal tar component.

4. A paving grade asphalt composition produced in accordance with the process of claim 1.

5. A process for producing a ductile synthetic paving grade asphalt composition which comprises forming a slurry of coal tar having a boiling point between about 700° F. and 1000° F. and comminuted scrap rubber in a thermally stable highly refractory petroleum solvent having a boiling point above about 650° F., an average liable hydrogen content of about 0.3 percent or more, a benzylic hydroben (alpha) content of about 1.5 percent or more and a content of beta, gamma and other hydrogen of about 4 percent or less; and heating the slurry admixture thus formed to a temperature in the range between about 350° F. and 850° F. for a period of time sufficient to convert the slurry admixture into a homogeneous composition stable, asphaltic properties at ambient temperatures and having an ASTM penetration value of 40–300 at 77° F.

6. A process in accordance with claim 5 wherein the slurry admixture is heated for a period of time up to about 3 hours.

7. A process in accordance with claim 5 wherein the ratio of scrap rubber to coal tar in the slurry admixture is in the range between about 0.01 and 5 parts by weight of scrap rubber per part by weight of coal tar.

8. A process in accordance with claim 5 wherein the petroleum solvent component in the slurry admixture is present in a quantity between about 0.2 and 20 parts by weight per part of the combined weight of coal tar and scrap rubber components in the slurry admixture.

9. A ductile synthetic paving grade asphalt composition produced in accordance with the process of claim 5.

* * * * *